United States Patent
Buehler et al.

(10) Patent No.: US 10,541,431 B2
(45) Date of Patent: Jan. 21, 2020

(54) COOLING ARRANGEMENT FOR COOLING A FUEL CELL

(71) Applicant: Daimler AG, Stuttgart (DE)

(72) Inventors: Maximilian Buehler, Kaufbeuren (DE); Uwe Pasera, Esslingen (DE); Ottmar Schmid, Markdorf (DE); Bernhard Vogel, Stuttgart (DE)

(73) Assignee: Daimler AG, Stuttgart (DE)

( * ) Notice: Subject to any disclaimer, the term of this patent is extended or adjusted under 35 U.S.C. 154(b) by 191 days.

(21) Appl. No.: 15/556,921

(22) PCT Filed: Feb. 12, 2016

(86) PCT No.: PCT/EP2016/000241
§ 371 (c)(1),
(2) Date: Sep. 8, 2017

(87) PCT Pub. No.: WO2016/142029
PCT Pub. Date: Sep. 15, 2016

(65) Prior Publication Data
US 2018/0053950 A1   Feb. 22, 2018

(30) Foreign Application Priority Data
Mar. 10, 2015 (DE) .................. 10 2015 003 028

(51) Int. Cl.
*H01M 8/04029* (2016.01)
*H01M 8/04007* (2016.01)

(52) U.S. Cl.
CPC ... *H01M 8/04029* (2013.01); *H01M 8/04074* (2013.01); *H01M 2250/20* (2013.01)

(58) Field of Classification Search
CPC ......... H01M 8/04029; H01M 8/04074; H01M 8/04111; H01M 8/04268; H01M 8/04037;
(Continued)

(56) References Cited

U.S. PATENT DOCUMENTS 8,231,989 B2 * 7/2012 Lebzelter .......... H01M 8/04037
                                                                   429/429
8,343,677 B2 * 1/2013 Song .................. H01M 8/04268
                                                                   429/428
(Continued)

FOREIGN PATENT DOCUMENTS

DE   102 03 311 B4   7/2003
EP   1 111 214 A2    6/2001
(Continued)

OTHER PUBLICATIONS

PCT/EP2016/000241, International Search Report dated Apr. 12, 2016 (Two (2) pages).
(Continued)

*Primary Examiner* — Justin M Jonaitis
(74) *Attorney, Agent, or Firm* — Crowell & Moring LLP

(57) ABSTRACT

A cooling arrangement for cooling a fuel cell in a fuel cell system is disclosed. The cooling arrangement has at least two fluidically connected cooling circuits in which a liquid coolant medium flows, The first cooling circuit includes a first coolant pump, a fuel cell heat exchanger, a heating unit, and a charge air cooler, which is in heat-exchanging contact with compressed supply air flowing to the fuel cell. The second cooling circuit includes a cooling heat exchanger for cooling the liquid coolant medium. The cooling arrangement includes at least one further coolant pump.

16 Claims, 2 Drawing Sheets

(58) Field of Classification Search
CPC ..... H01M 2250/20; H01M 8/00; B60L 58/33; B60L 58/34; B60L 1/003; B60L 1/02; B60L 50/72; Y02T 90/32; Y02T 90/34
USPC ...... 165/287, 41, 42, 44, 202; 429/400, 434, 429/435, 436, 433
See application file for complete search history.

(56) References Cited

U.S. PATENT DOCUMENTS

| | | | |
|---|---|---|---|
| 8,393,551 B2 * | 3/2013 | Nemesh | B60H 1/00392 237/12.3 B |
| 8,909,398 B2 * | 12/2014 | Sawada | B60K 11/02 165/200 |
| 9,831,510 B2 * | 11/2017 | Patel | H01M 8/04201 |
| 2001/0050191 A1 | 12/2001 | Ogawa et al. | |
| 2006/0240298 A1 * | 10/2006 | Yamada | H01M 8/04044 429/440 |
| 2014/0103128 A1 * | 4/2014 | Patel | B60H 1/00885 237/5 |

FOREIGN PATENT DOCUMENTS

| | | |
|---|---|---|
| EP | 1 836 742 B1 | 9/2007 |
| JP | 2005-108458 A | 4/2005 |
| JP | 2007-280927 A | 10/2007 |
| JP | 2013-251231 A | 12/2013 |

OTHER PUBLICATIONS

Japanese Notification of Reason for Refusal issued in Japanese counterpart application No. 2017-547407 dated Jun. 26, 2018, with partial English translation (Five (5) pages).

* cited by examiner

COOLING ARRANGEMENT FOR COOLING A FUEL CELL

BACKGROUND AND SUMMARY OF THE INVENTION

The invention relates to a cooling arrangement for cooling a fuel cell in a fuel cell system.

Cooling arrangements for cooling a fuel cell are known from the general prior art. In particular in vehicle applications of fuel cells or fuel cell systems, high-efficiency cooling, on the one hand, and a good option for heating up the fuel cell rapidly in the case of a cold start, on the other hand, play a decisive role.

A fuel cell system having a cooling circuit of the type in question is known in greater detail from DE 102 03 311 B4. For the above-mentioned reasons, this cooling circuit has a controllable radiator bypass, to thus achieve a flow of liquid coolant medium through the cooling heat exchanger in regular operation and to bypass the cooling heat exchanger for the cold start case, to thus be able to heat up the fuel cell more rapidly. This "small" cooling circuit through the radiator bypass comprises, in addition to the fuel cell heat exchanger, a charge air cooler and a coolant pump. In the cold start case, the fuel cell can thus be heated comparatively rapidly using heat from the charge air cooler via the fuel cell heat exchanger. In regular operation, both the charge air cooler and also the fuel cell are then cooled via the fuel cell heat exchanger, wherein the liquid coolant medium heated in the charge air cooler and the fuel cell heat exchanger is cooled via the cooling heat exchanger. The construction of the cooling arrangement described in the prior art of the type in question has two disadvantages in its core concept in this case. On the one hand, the arrangement of the charge air cooler and the fuel cell heat exchanger in the small cooling circuit does result in rapid heating of the fuel cell in the cold start case. On the other hand, the construction described therein, in which flow occurs firstly through the charge air cooler and then the fuel cell has the disadvantage for regular operation, i.e., cooling operation for the fuel cell, that the coolant medium has already been heated relatively strongly via the charge air cooler, before it flows into the fuel cell heat exchanger. This impairs efficient cooling of the fuel cell. A further very severe disadvantage is that the coolant pump has to be designed for the highest load operation of the cooling. It is therefore overdimensioned for the cold start case and the operation of the small cooling circuit and accordingly has worse efficiency in the case of the required volume flows and delivery rates occurring therein. This represents a significant disadvantage, in particular because in these situations all of the power required for heating the fuel cell firstly has to come from an electrical energy store, for example a battery. A coolant pump which is inefficient in this situation therefore results in the necessity of a comparatively large electrical energy storage device, with the corresponding disadvantages with respect to installation space and costs. In particular in an application in a vehicle, this represents a significant disadvantage.

A similar construction having a main cooling circuit divided into multiple branches and a small cooling circuit operated in the cold start case having the fuel cell heat exchanger and a heating unit is known from the further prior art in the form of EP 1 836 742 B1. The construction, as can already be seen from the illustration of the figure, is extraordinarily complex and requires a variety of valve units, which accordingly require a large amount of installation space and cause a need for control and costs. A further disadvantage here is the drive of the coolant pump in the small circuit via an expander and therefore indirectly via the main coolant pump. This construction has a correspondingly poor efficiency, so that here the main coolant pump requires even more power for the case of a cold start than in the above-described exemplary embodiment, so that this arrangement, in addition to the above-mentioned disadvantages, also has the above-described severe disadvantage with respect to the high demand for power in the cold start.

The object of the present invention here is to specify a cooling arrangement for a fuel cell in a fuel cell system, which is improved in relation to the prior art, and which in particular avoids the above-mentioned disadvantages.

In the cooling arrangement according to the invention, it is provided, similarly to the prior art of the type in question, that the cooling arrangement has at least two cooling circuits which are fluidically connected to one another, and in which a liquid coolant medium flows. The first cooling circuit comprises in this case a first coolant pump, a fuel cell heat exchanger, a heating unit, and a charge air cooler. The second cooling circuit comprises a cooling heat exchanger for cooling the coolant medium. It is provided according to the invention in this case that an additional coolant pump is provided. The construction can now be operated so that, for example, for the cold start case, essentially the first cooling circuit having its coolant pump, the fuel cell heat exchanger, the charge air cooler, and the heating unit is operated. Heat is introduced into the liquid coolant medium in the first cooling circuit by the heating unit and, as soon as the air supplied to the cathode side of the fuel cell is started, by the supply air, which is hot after the compression. Since the first cooling circuit can be operated independently of the second cooling circuit, efficient heating of the fuel cell via the heat from the compressed supply air and the heat introduced via the heating unit, for example, an electrical resistance heater, can thus be performed with correspondingly lower thermal mass. Because the first cooling circuit can be operated independently of the second cooling circuit, cooling of the liquid coolant medium in the cooling heat exchanger is prevented, so that the construction accordingly heats up rapidly.

In contrast to a solution having a radiator bypass around the cooling heat exchanger, as is known from the prior art, this construction has the decisive advantage in this case that comparatively efficient circulation of the liquid coolant medium in the first cooling circuit can be performed by the second coolant pump, which typically does not have to be operated in this situation of heating the fuel cell. This is because the first coolant pump can be optimized for a lower volume flow and a lower delivery rate than the pumps in the prior art. Therefore, with ideal efficiency of the first coolant pump for the described intended use, very efficient circulation of the liquid coolant medium for heating the fuel cell can be achieved. This represents a substantial advantage with respect to the capacity and the construction of the electrical energy storage unit, in particular in an application in a vehicle, in which the electrical power required for this purpose for the coolant pump, at least in the starting phase, originates from an electrical energy storage unit.

In a regular operating situation, in which the fuel cell has to be cooled, for example, in the case of cooling the fuel cell in full-load operation of a vehicle equipped with the fuel cell system, both coolant pumps can then assume the delivery of the liquid coolant medium in series one behind the other. In this way, a greater volume flow is accordingly possible, wherein the individual coolant pumps can nonetheless be optimized as small and efficient for the respective operating situation, in which they primarily have to assume the load of the delivery of the volume flow of liquid coolant medium. Thus, for example, two small and therefore cost-effective pumps may be used, which together supply the required maximum rate, and if they are each operated alone, can provide a smaller volume flow at high efficiency.

A further very advantageous embodiment of the cooling arrangement according to the invention provides in this case that the charge air cooler is arranged after the fuel cell heat exchanger in the flow direction of the coolant medium. This arrangement of the charge air cooler in the flow direction of the coolant medium after the fuel cell heat exchanger ensures in regular operation that the coolant medium, before it enters the fuel cell, accordingly has not already been strongly heated by the charge air cooler, which would represent a not insignificant disadvantage. Rather, via the described arrangement, the fuel cell can have incident flow of comparatively cool coolant medium and can be cooled reliably and efficiently. The temperature of the coolant medium when it leaves the fuel cell or the fuel cell heat exchanger again is still sufficient in this case to cool down the supply air, which is comparatively hot after the compression, to an extent which is necessary for the reliable operation of the fuel cell. The coolant medium will then have a correspondingly high temperature after the charge air cooler. Ideally, it then flows more or less directly to the cooling heat exchanger in cooling operation. Therein, the possible cooling is typically dependent on the temperature difference between the ambient air and the liquid coolant medium flowing into the cooling heat exchanger. The higher this temperature difference, the higher the temperature of the liquid coolant medium at this point of the cooling arrangement—with ambient temperature which is typically not to be influenced—the better and more efficient the cooling. Due to the arrangement of the charge air cooler in the flow direction of the coolant medium, ideally directly before the cooling heat exchanger, particularly efficient cooling of the liquid coolant medium is thus achieved. Accordingly, the surface area of the cooling heat exchanger can be reduced or a higher cooling power can be achieved with equal surface area. This is of decisive advantage in particular in vehicle operations, because the surface area available here of the cooling heat exchanger is typically due to design specifications, which represents a severe disadvantage in regular cooling arrangements for fuel cells, because of the comparatively low operating temperature of a fuel cell in comparison to an internal combustion engine. This can be significantly reduced by the described arrangement of the charge air cooler in the flow direction after the fuel cell heat exchanger.

In heating operation, in which the fuel cell is to be heated, in the cooling arrangement according to the invention, only the first cooling circuit has a comparatively small thermal mass flowing through it. In this case, it plays approximately no role whether the charge air cooler is arranged before or after the fuel cell in the flow direction of the coolant medium. Because of the comparatively short running length of the liquid coolant medium in the first cooling circuit, the heat from the charge air cooler is moved comparatively efficiently into the fuel cell heat exchanger after flowing through the entire first circuit even in the above-described arrangement. Because of the above-described advantages in regular operation, the arrangement according to this embodiment is therefore preferable in any case. A further advantage of the arrangement of the charge air cooler and the fuel cell heat exchanger in the same (small) cooling circuit is additionally that the air for the cathode side of the fuel cell and the coolant medium for the fuel cell heat exchanger are temperature-controlled uniformly by the charge air cooler. Good water management may be achieved in the fuel cell in this way. Due to the uniform heating of the fuel cell itself via the fuel cell heat exchanger and via the air flowing to the cathode side of the fuel cell from the charge air cooler, in addition to good water management, the introduction of thermal tensions into the region of the fuel cell is also reduced, which results in a longer service life of the fuel cell, because clamping units and seals of the fuel cell stack are loaded much less than if the fuel cell itself and the air flowing therein have greater temperature differences.

A further very advantageous embodiment of the cooling arrangement according to the invention furthermore provides a chamber heat exchanger for at least indirect heating of a chamber in one of the cooling circuits. Such a chamber heat exchanger is used for heating a chamber arranged in the region of the fuel cell system. In the case of the preferred application in a vehicle, it can be in particular an interior heat exchanger, via which a passenger compartment can be heated. According to a very advantageous refinement of this concept, the chamber heat exchanger is provided in this case in the first cooling circuit. The chamber heat exchanger can thus be provided in a particularly advantageous manner together with the fuel cell, the heating unit, and the charge air cooler and the first coolant pump in the first cooling circuit. In this way, it is possible to perform heating of the chamber, in particular the interior of a vehicle, via the chamber heat exchanger already very early after the start of the vehicle, to thus enable a high level of thermal comfort for the user of the vehicle.

A further very advantageous embodiment of the concept furthermore provides that the second cooling circuit has two partial circuits, which both comprise a coolant pump, wherein the chamber heat exchanger and the heating unit are arranged in the same partial circuit, and wherein the fuel cell heat exchanger is arranged in the other partial circuit. Due to this construction having an allocation of the first cooling circuit into two partial circuits it is possible to operate these partial circuits, each of which has a coolant pump, independently of one another. Thus, a high level of comfort for the chamber, in particular the interior of a vehicle, can be provided. This is because heating of the chamber can be performed via operation of only one partial circuit, which has a coolant pump, the chamber heat exchanger, and the heating unit, without the fuel cell or the fuel cell system also having to be heated or started for this purpose. On the other hand, an operation of the second partial circuit also enables heating of only the fuel cell, without the interior also being heated. This would also be conceivable by not having chamber air flowing through the chamber heat exchanger, but in this case the additional flow resistance of the chamber heat exchanger would be present in the small cooling circuit, so that due to the alternative construction having the partial circuits, a further optimization of the energy required for heating the fuel cell via the first cooling circuit can be achieved.

According to a further advantageous embodiment of the cooling arrangement according to the invention, it can also be provided that the chamber heat exchanger is arranged in a radiator bypass line to the cooling heat exchanger. The chamber heat exchanger can thus be arranged to have flow through it alternatively or additionally in parallel to the cooling heat exchanger and thus, for the case in which the chamber is to be heated, can also assist the cooling of the coolant medium, in particular in regular operation of the fuel cell system. At the same time, components can be saved, since due to the arrangement in the radiator bypass line, no additional line branch is necessary for the chamber heat exchanger with comparable functionality.

A further very advantageous embodiment of the cooling arrangement according to the invention can additionally have at least one heating heat exchanger for heating a component assigned thereto in the flow direction before the fuel cell heat exchanger. Such a heating heat exchanger can thus be used for heating a further component or a further medium. Cooling of the liquid coolant medium in the cooling circuit is thus achieved via the heating heat exchanger. The heating heat exchanger can be used in the fuel cell system, for example, to heat expanded fuel for the fuel cell. For example, if hydrogen from a compressed gas accumulator at a nominal pressure of 70 MPa is used, it typically has to be expanded to a very much lower pressure level, before it is introduced into the fuel cell. The hydrogen cools down very strongly upon this expansion to a lower pressure level. This could result in thermal tensions and possibly in condensing out—and at worst freezing—of moisture in the fuel cell. Therefore, the expanded hydrogen is typically heated. This can now be performed via a heating heat exchanger, which is arranged in the cooling arrangement according to the invention in the described advantageous embodiment before the fuel cell heat exchanger in the flow direction. In this way, the temperature of the liquid coolant medium can be reduced further before the fuel cell heat exchanger, to thus ensure particularly efficient cooling of the fuel cell in regular operation.

The heating heat exchanger can advantageously be provided in the second cooling circuit after the cooling heat exchanger in the flow direction. Alternatively or additionally to heating the expanded hydrogen, it can also be used for heating a water separator, for example a water separator in the cathode exhaust air of the fuel cell, to prevent freezing thereof here. Via both functionalities, which can be arranged alternatively to one another or also in series to one another, preferably with a flow first through the heating heat exchanger for the expanded fuel and then the heating heat exchanger for the water separator, in any case the temperature of the liquid coolant medium is reduced, which results in an advantage in the cooling of the fuel cell.

In this case, according to an advantageous refinement, the heating heat exchanger or exchangers can have the liquid coolant medium flow through them in series or in parallel with an ion exchanger. The temperature is also reduced in the region of an ion exchanger. Moreover, the service life of the ion exchanger may be lengthened by a comparatively low temperature of the liquid coolant medium. Both the ion exchanger and also the heating heat exchanger or exchangers can be arranged in parallel to one of the coolant pumps in this case according to an advantageous refinement of the concept. In this way, the coolant medium flows through sufficiently in cooling operation for the fuel cell, without the entire volume flow of the liquid coolant medium having to flow through the components, which is not necessary, on the one hand, and would result in higher pressure losses and accordingly a poor energetic efficiency, on the other hand.

Further advantageous embodiments of the cooling arrangement according to the invention furthermore result from the further dependent subclaims and will become clear on the basis of the exemplary embodiments, which are described in greater detail hereafter with reference to the figures.

DETAILED DESCRIPTION OF THE DRAWINGS

Figure 1:
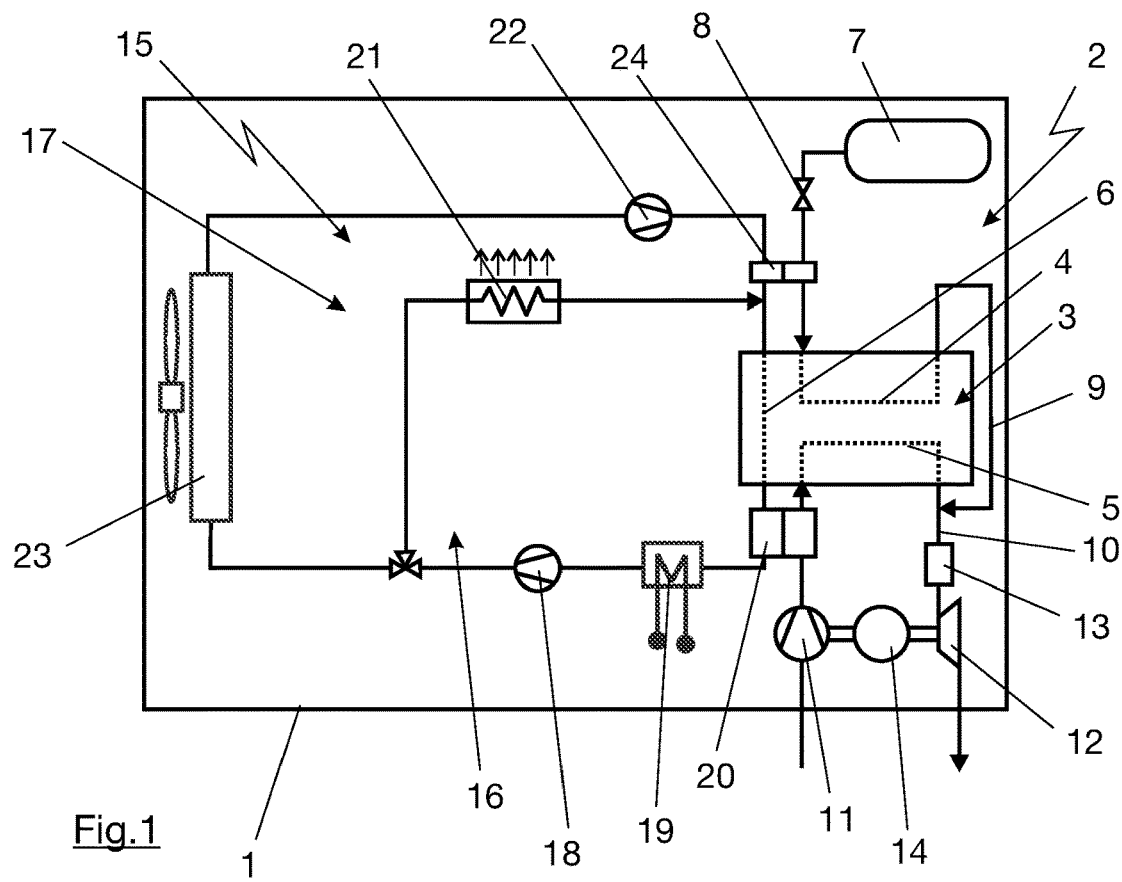
FIG. 1 shows a schematically illustrated fuel cell vehicle.

A vehicle 1 is indicated very schematically in the illustration of FIG. 1. This vehicle 1 is to be designed as a fuel cell vehicle. The electrical drive power for the vehicle 1 is provided via a fuel cell system 2, which is indicated very schematically in the illustration of FIG. 1. A fuel cell 3, which can be embodied in particular as a stack of single cells, preferably in PEM technology, forms the core of the fuel cell system 2. Solely by way of example, a common anode region 4, a common cathode region 5, and a fuel cell heat exchanger 6 for the temperature control of the fuel cell 3 are indicated inside the fuel cell 3.

Hydrogen is provided to the anode region 4 of the fuel cell 3 as fuel. This hydrogen is stored at a nominal pressure of, for example, 70 MPa in a compressed gas accumulator 7 and flows via a regulating and metering unit 8 to the anode region 4 of the fuel cell 3. Non-consumed fuel reaches the region of an exhaust air line 10, which will be explained in greater detail hereafter, from the cathode region 5 of the fuel cell 3 via an exhaust gas line 9 in the exemplary embodiment shown here. Air is provided to this cathode region 5 of the fuel cell 3 as an oxygen supplier via an air delivery line 11. This air delivery line 11 can be designed as a flow compressor, for example. The residual air from the cathode region 5 of the fuel cell 3 reaches an exhaust air turbine 12 via the above-mentioned exhaust air line 10, in the region of which thermal energy and pressure energy are at least partially reclaimed from the exhaust air. In addition, the exhaust gas flowing out of the anode region 4 via the exhaust gas line 9, which can also still contain residual hydrogen, is diluted via the exhaust air flowing through the exhaust air line 10. In this case, a so-called anode circuit can additionally be provided on the anode side of the fuel cell 3. It is not shown. However, it is routine for a person skilled in the art in fuel cell technology, so that he could add it here without problems. This applies comparably to an air humidifier on the cathode side.

To protect the exhaust air turbine 12 from liquid droplets, a liquid separator or water separator 13 is typically additionally provided in the exhaust air line 10. This water separator 13 separates liquid droplets from the exhaust air in the exhaust air line 10 and discharges them in liquid form. The exhaust air itself flows through the exhaust air line 10 further to the exhaust air turbine 12. The exhaust air turbine 12 is arranged together with the air delivery unit 11 on a common shaft, which additionally has an operational connection to an electric machine 14. This electric machine 14 can in particular provide the power, which is required in addition to the power supplied by the exhaust air turbine 12, for the drive of the air delivery unit 11. In certain situations, when more power arises in the region of the exhaust air turbine 12 than is required by the air delivery unit 11, the electric machine 14 can additionally be operated as a generator. This construction is also routine to a person skilled in the art and is frequently referred to as an electric turbocharger (ETC) or motor-assisted turbocharger.

To be able to cool the fuel cell 3 via the fuel cell heat exchanger 6 in regular operation, a cooling arrangement 15 is additionally provided in the vehicle 1. This cooling arrangement 15 comprises, in the exemplary embodiment shown here, a first cooling circuit 16, which can also be referred to as a small cooling circuit. It has a fluidic connection to a second (large) cooling circuit 17. The liquid coolant medium is conveyed in the region of the first cooling circuit 16 by a first coolant pump 18 and flows through a heating unit 19 for the liquid coolant medium, which is indicated in the exemplary embodiment shown as an electrical resistance heater. The heating unit could just as well be designed differently, for example, by reacting hydrogen via a flame combustion or a catalytic combustion and supplying the waste heat to the liquid coolant medium. In addition, a charge air cooler 20 is located in the first cooling circuit. This charge air cooler 20 is designed as a heat exchanger, through which the hot compressed supply air to the cathode region 5 of the fuel cell flows on one side thereof after the air delivery unit 11. The liquid coolant medium flows through the other side of the charge air cooler 20, which is in heat-conducting contact therewith. In this way, the hot compressed air is cooled, so that the fuel cell 3 is not thermally stressed by the air and the membranes thereof are not dried out. Simultaneously thereto, of course, the liquid coolant medium is heated by the charge air cooler 20. A further component inside the first cooling circuit 16 is a chamber heat exchanger 21, via which the interior of the vehicle can be heated if needed, by air, which flows into the interior of the vehicle 1 or is circulated therein, flowing through the chamber heat exchanger 21, as indicated by the arrows.

A further part of the first cooling circuit 16 is, after the chamber heat exchanger 21 and before the charge air cooler 20 in the flow direction, the above-described fuel cell heat exchanger 6 for the temperature control of the fuel cell 3. Via this fuel cell heat exchanger 6, if needed, the fuel cell 3 can be heated for the cold start case if needed, or waste heat can be discharged from the fuel cell 3 in regular operation. The first cooling circuit 16 is typically operated in the cold start case by the liquid coolant medium, originating from the coolant pump 18, firstly flowing through the chamber heat exchanger 21, then the fuel cell heat exchanger 6, then the charge air cooler 20, and finally the heating unit 19. The first cooling circuit 16 is comparatively small in this case and has a correspondingly small thermal mass. In this way, rapid heating of the components, in particular the fuel cell 3, is possible by way of the energy introduced via the compressed charge air from the charge air cooler 20 and if needed via the heating unit 19. If needed, the interior of the vehicle can be heated simultaneously, by air flowing through the chamber heat exchanger 21.

For the regular operation of the fuel cell system 2 in the vehicle 1, a combination is typically provided of this first cooling circuit 16 with the second cooling circuit 17, which has a further coolant pump 22 and a cooling heat exchanger 23 for the discharge of heat into the surroundings of the vehicle 1. For example, to be able to cool the fuel cell 3 sufficiently via the fuel cell heat exchanger 6 at electrical full load of the fuel cell system 2, for example, during a hill climb of the vehicle 1 at high velocity, the liquid coolant medium is circulated via the two coolant pumps 18, 22, which then act in series. In this way, a comparatively greater volume flow is achieved with nonetheless moderate structural size of the two coolant pumps 18, 22. In this way, very good cooling of the fuel cell 3 is possible via the fuel cell heat exchanger 6. In particular, in this case the chamber heat exchanger 21 can have flow through it in parallel to the cooling heat exchanger 23 if needed, to discharge further heat from the liquid coolant medium, in this case into the interior of the vehicle 1.

A further advantage of the construction is that the charge air cooler 20 is arranged after the fuel cell heat exchanger 6 in the flow direction of the liquid coolant medium. In this way, it is possible to specify the entry temperature of the liquid coolant medium as it flows into the fuel cell heat exchanger 6 as very low, in order to thus be able to cool the fuel cell 3 ideally. Since the fuel cell 3 typically has a temperature of less than 100° C., the liquid coolant medium is still sufficiently "cool" even after the fuel cell 3 to be able to cool down the temperature of the compressed supply air of typically approximately 200° C. in the charge air cooler enough that the fuel cell is not unnecessarily stressed even at full load. The heating unit 19 is turned off, of course, in such a full-load situation.

In the illustration of FIG. 1, a heating heat exchanger 24 can additionally be seen as a further part of the second cooling circuit 17. The task thereof is to heat the hydrogen, which is comparatively cold after the expansion, from the compressed gas accumulator 7. In this way, liquid is prevented from condensing out in the anode region 4 of the fuel cell 3. The liquid coolant medium is cooled down simultaneously in the heating heat exchanger 24, since it discharges heat to the expanded hydrogen. The liquid coolant medium may thus ideally be cooled before the entry into the fuel cell heat exchanger 6 to a temperature which is below the ambient temperature, as the minimum temperature of the liquid coolant medium to be achieved by the cooling heat exchanger 23. This results in particularly efficient cooling of the fuel cell 3 via the fuel cell heat exchanger 6 and enables a particularly high level of cooling power of the cooling arrangement 15, so that a power limitation of the fuel cell system 2 caused by the cooling arrangement 15 can be prevented or at least delayed. In this way, it is possible even in the event of a high ambient temperature to operate the fuel cell vehicle 1 at high power, which represents a substantial advantage for the user of the vehicle.

Further detailed embodiments of the cooling arrangement 15 according to the invention are shown once again in greater detail in different operating states in the following figures. The components already explained in the context of FIG. 1 are shown in this case via comparable schematic symbols, so that reference can be made to the description of FIG. 1 with respect to these components.

Figure 2:
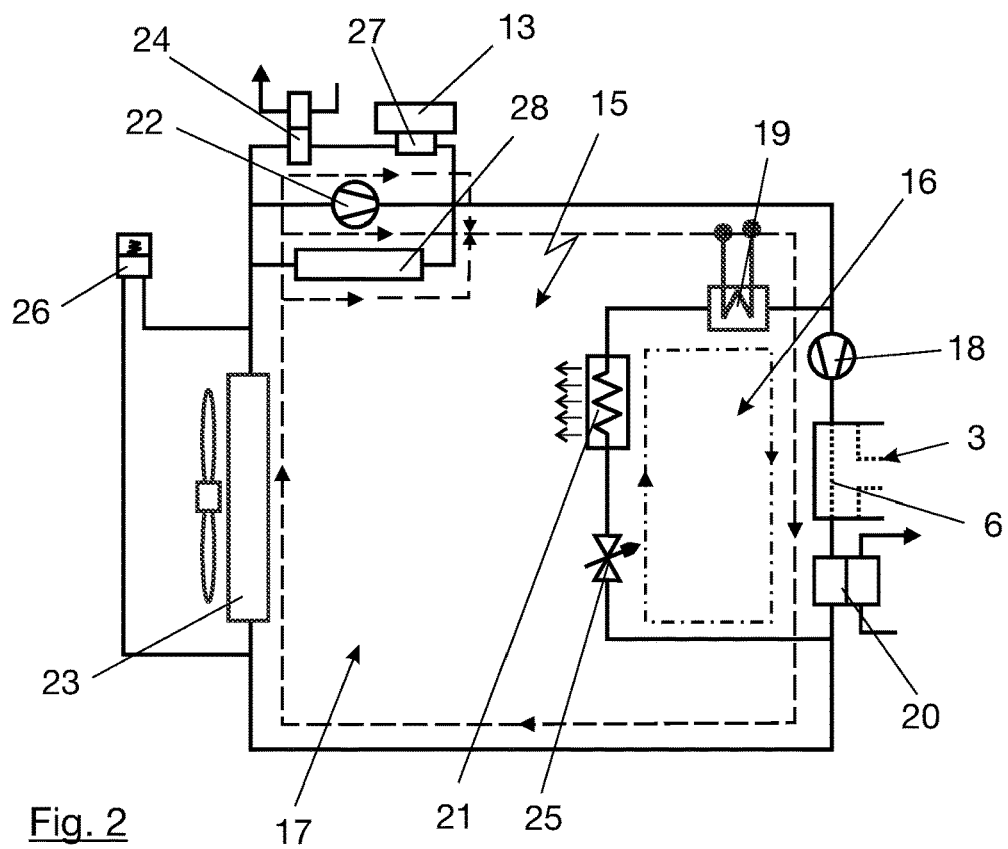
FIG. 2 shows a first possible embodiment of the cooling arrangement in two different operating states.

A cooling arrangement 15 similar to the illustration in FIG. 1 can be seen in FIG. 2. The first cooling circuit 16 also comprises the first coolant pump 18 here, in the flow direction thereafter, the fuel cell heat exchanger 6 of the fuel cell 3, the charge air cooler 20, and also the chamber heat exchanger 21 and the heating unit 19. Flow occurs through the components in this sequence with open control valve 25 in heating operation of the fuel cell system 2. This through flow in heating operation is indicated by dot-dash lines in FIG. 2. In addition, the operation in the regular operating mode for cooling the fuel cell 3 is indicated by dashed lines. The control valve 25 is entirely closed for this purpose, or is at least partially closed in the event of corresponding demand for heat for the interior heating. The primary volume flow indicated by dashed lines here of the liquid coolant medium then again flows, proceeding from the first coolant pump 18, through the fuel cell heat exchanger 6 of the fuel cell 3 and the charge air cooler 20. After the charge air cooler 20, the liquid coolant medium is heated to the maximum temperature occurring in the cooling arrangement 15 and flows into the cooling heat exchanger 23. Due to the comparatively high temperature difference of the liquid coolant medium flowing into the cooling heat exchanger 23 in relation to the ambient temperature, very efficient cooling of the coolant medium may be implemented in the cooling heat exchanger 23. In parallel to the cooling heat exchanger 23, a coolant compensation container 26 is indicated in each of the illustrations of FIGS. 2 to 4. This container is typically provided in the cooling arrangement 15, but is of subordinate significance for the invention, so that it does not have to be discussed in greater detail.

After the cooling heat exchanger 23, the coolant medium then flows via three parallel branches of the second cooling circuit 17 back to the first coolant pump 18 again. The middle branch comprises the second coolant pump 22 in this case, which is operated in series with the coolant pump 18 in the event of a corresponding demand for a high-volume flow of coolant medium. In parallel to this coolant pump 22, and therefore only having a part of the occurring volume flow flowing through it, the heating heat exchanger 24 for heating the expanded hydrogen is again located. In the flow direction thereafter, a further heating heat exchanger 27 is arranged, which is used for heating the water separator 13 in the exhaust air line 10 of the cathode region 5. An ion exchanger, which is identified with 28, is located in the second line branch arranged parallel to the coolant pump 22. This ion exchanger can be necessary to permanently reduce the conductivity of the liquid coolant medium during the operation of the fuel cell system 2, to thus avoid undesired electrical potential in the region of the coolant medium and in the region of grounded components in contact with the coolant medium. The ion exchanger 28 operates particularly efficiently and gently for the service life of the ion exchanger 28 when it has incident flow of cool liquid coolant medium. It is therefore arranged after the cooling heating exchanger 23 in the flow direction, to thus be in contact with correspondingly cooled coolant medium. Otherwise, as already noted, a medium is heated outside the cooling arrangement 15 via the heat exchangers 24 and 27 and the liquid coolant medium is thus cooled again. It then comes, conveyed via the coolant pump 18, into the fuel cell heat exchanger 6 with correspondingly lower temperature and can thus cool the fuel cell 3 ideally.

Figure 3:
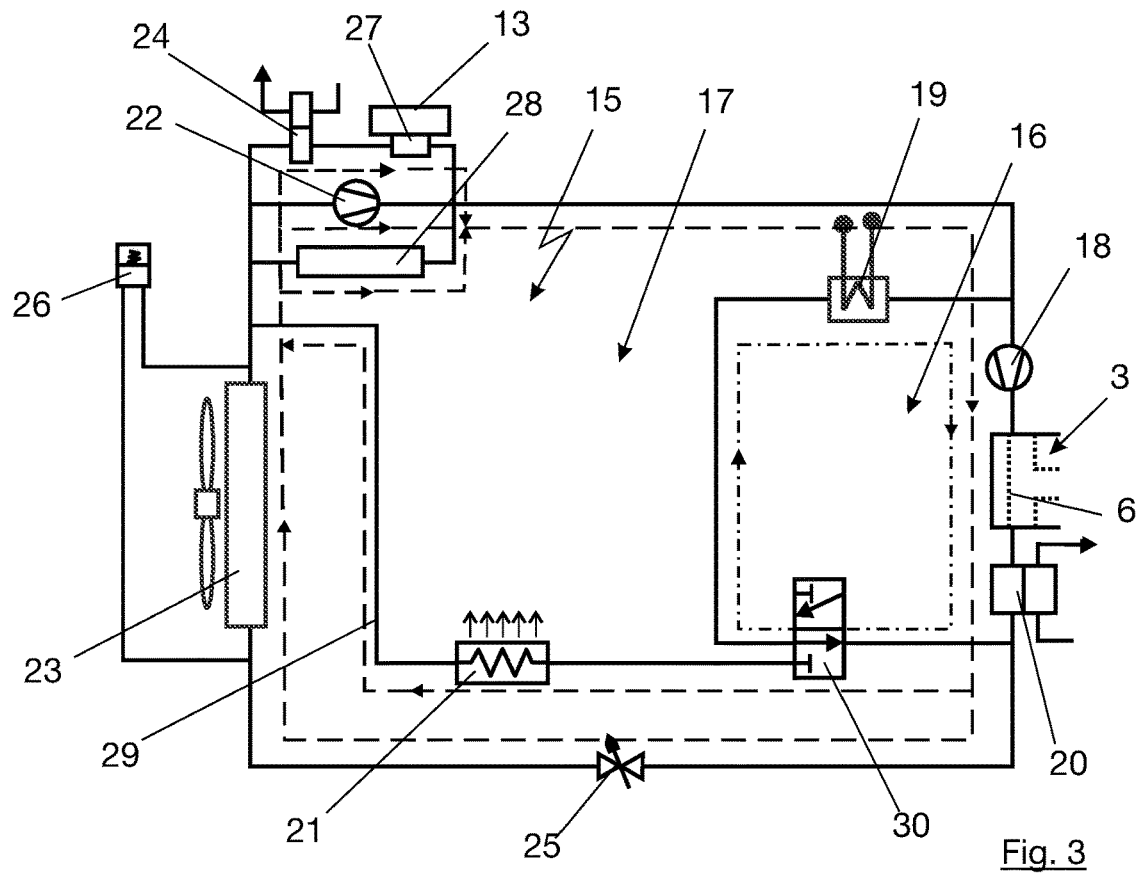
FIG. 3 shows a second possible embodiment of the cooling arrangement in two different operating states.

The construction shown in FIG. 3 similarly to the illustration and explanation in FIG. 2 differs from the construction shown in FIG. 2 essentially only in that the control valve 25 has been displaced from the first cooling circuit 16 into the second cooling circuit 17 and specifically into the region between the charge air cooler 20 and the cooling heat exchanger 23. In addition, the chamber heat exchanger 21 is now located in a radiator bypass 29, which can be activated via a valve unit 30 so that flow can occur through the chamber heat exchanger 21 entirely or, depending on the position of the control valve 25, partially in parallel to the cooling heat exchanger 23. The position of the valve unit 30 in the illustration of FIG. 3 prevents this, however, by accordingly disconnecting the radiator bypass 29 and closing the first cooling circuit 16. Therefore, without heating the interior of the vehicle 1, heating of the fuel cell 3 can occur via the fuel cell heat exchanger 6 similarly to the illustration in FIG. 2. This is also shown in FIG. 3 by the flow of the coolant medium indicated by the dot-dash lines. In regular cooling operation of the fuel cell system 2, as indicated by dashed lines, the valve unit 30 is switched over accordingly, so that, as already mentioned above, the chamber heat exchanger 21 and the cooling heat exchanger 23 can have flow through them in parallel. Otherwise, the construction corresponds in its functionality to the construction already described in FIG. 2.

The exemplary embodiment of the cooling arrangement 15 according to FIG. 3 does not offer the same comfort to the occupants of the vehicle in this case as the above-described exemplary embodiment of the cooling arrangement 15. However, it enables more rapid heating of the fuel cell and therefore a shorter start time for the vehicle 1, which represent such a substantial advantage that the comfort losses accompanying this can certainly be accepted by the user or can be compensated for by an independent auxiliary heater.

Figure 4:
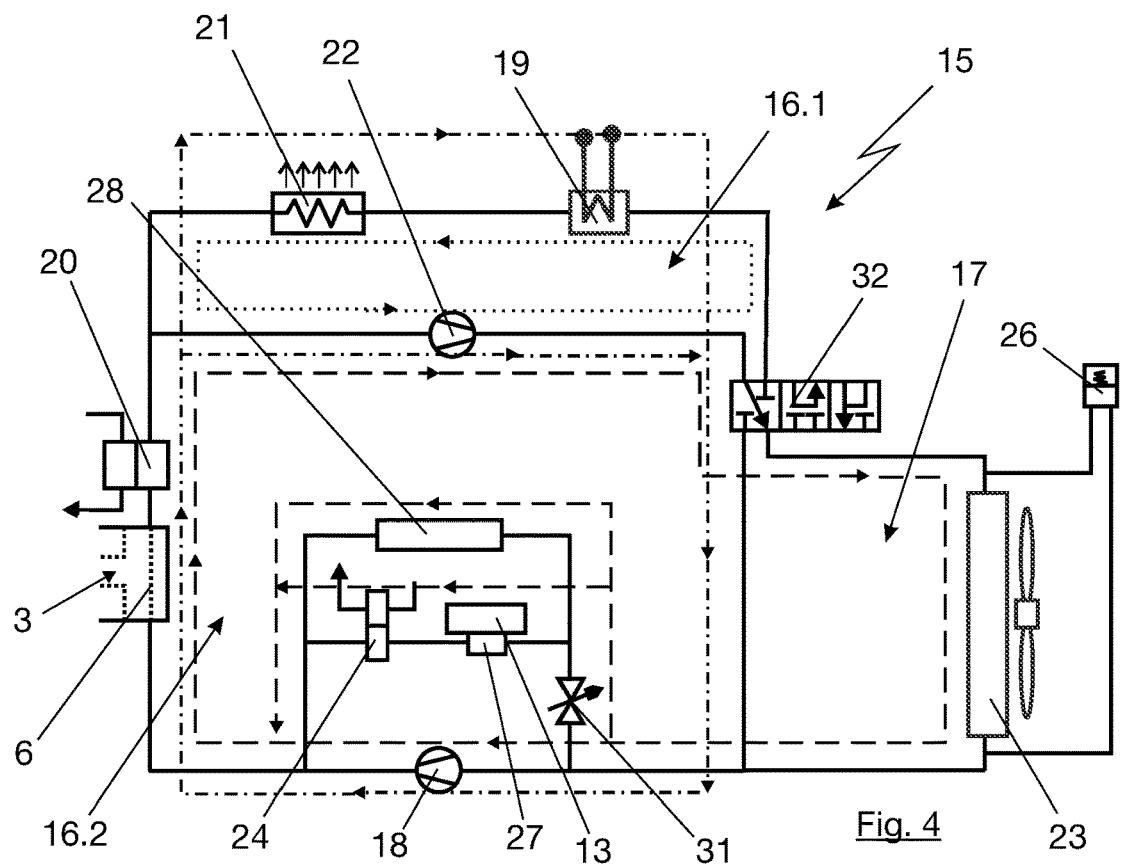
FIG. 4 shows a third possible embodiment of the cooling arrangement in three different operating states.

A further conceivable construction of a cooling arrangement 15 is shown in the illustration of FIG. 4. In contrast to the previous embodiments, the first cooling circuit 16 is divided here into two partial circuits 16.1 and 16.2. The first partial circuit 16.1 comprises the second coolant pump 22 and the chamber heat exchanger 21 and the heating device 19. The other partial circuit 16.2 comprises the first coolant pump 18, the fuel cell 3 having its fuel cell heat exchanger 6, and the charge air cooler 20. In the illustration of FIG. 4, the operation for heating the fuel cell 3 is again shown by dot-dash lines, similarly to the preceding figures. A control valve 31, via which the heating heat exchangers 24 and 27, which are part of the second cooling circuit 17, and, in parallel thereto, the ion exchanger 21 are incorporated, is typically closed in this situation. A valve unit 32, which enables three different valve positions, is switched into its position shifted entirely to the left, in contrast to what is shown. The liquid coolant medium, conveyed by the first coolant pump 18, can now firstly flow through the fuel cell heat exchanger 6, then through the charge air cooler 20, and subsequently through the chamber heat exchanger 21 and through the heating unit 19. In this way, the circuit indicated by dot-dash lines is constructed. Due to the special design of the valve unit 32, it is additionally possible that the second coolant pump 22 also already engages to assist here. An alternative embodiment, in which the line branch having the second coolant pump 22 is blocked off, would also be conceivable, however.

In the illustration of FIG. 4, the regular operation for cooling the fuel cell 3 is again shown by dashed lines. The valve unit 32 is now, as shown, switched into its position shifted entirely to the right, so that the branch having the second coolant pump 22 is connected to the cooling heat exchanger 23. In this way, a through flow corresponding to the dashed line is achieved, wherein with open control valve 31, the liquid coolant medium can also flow through the ion exchanger 28 and the heating heat exchanger 24 and 27 for cooling. The construction corresponds in this case to the above-described constructions, so that the charge air cooler 20 is also arranged here in a thermally active manner before the cooling heat exchanger 23 in the flow direction, to achieve the highest possible temperature and therefore efficient cooling of the liquid coolant medium in the cooling heat exchanger 23.

A third conceivable embodiment variant of the operation of the cooling arrangement 15 is shown by dotted lines in the illustration of FIG. 4. In this operation, the valve unit 32 is switched to its middle position. In this way, the line branch having the second coolant pump 22 is connected directly to the line branch which has the heating unit 19 and the chamber heat exchanger 21. During operation of the second coolant pump 22 and the heating unit 19, heating of the interior of the vehicle 1 may thus be implemented via the partial circuit 16.1, without other components of the cooling arrangement 15 having to have flow through them and be operated. It is then possible to change directly from this state into the state indicated by dot-dash lines, to thus also heat up the fuel cell 3 in addition to the interior and subsequently be able to start the vehicle 1. The construction of the cooling arrangement 15 according to the exemplary embodiment illustrated in FIG. 4 therefore additionally enables the functionality of an auxiliary heater for the vehicle 1.

All in all, the cooling arrangement 15 is very efficient in all described embodiments, because it always has a first cooling circuit 16 having comparatively low thermal mass, to heat up the fuel cell 3. This can be performed using a small and efficient first coolant pump 18, which is then assisted for the case of the cooling of the fuel cell 3 by the second coolant pump 22 in series thereto and by the release of the second cooling circuit 17. In addition, the arrangement of the components in the flow direction of the liquid coolant medium is selected so that ideal thermal conditions prevail and, on the one hand, very good cooling of the fuel cell 3 and, on the other hand, very good cooling of the liquid coolant medium in the cooling heat exchanger 23 and/or the chamber heat exchanger 21 can be implemented. The cooling arrangement 15 is therefore, in all described embodiments, particularly advantageously and efficiently suitable for cooling the fuel cell system 2, in particular in the vehicle 1. Of course, the cooling arrangement 15 can also advantageously be used in stationary fuel cell systems 2 in the manner described—then typically without the chamber heat exchanger 21.

The invention claimed is:

1. A cooling arrangement for cooling a fuel cell in a fuel cell system, comprising:
   a first cooling circuit and a second cooling circuit, wherein the first and second cooling circuits are fluidically connected and wherein a liquid coolant medium flows in the first and second cooling circuits;
   wherein the first cooling circuit includes a first coolant pump, a fuel cell heat exchanger, a heating unit, and a charge air cooler which is in heat-exchanging contact with compressed supply air flowing to the fuel cell;
   wherein the second cooling circuit includes a cooling heat exchanger for cooling the liquid coolant medium;
   a second coolant pump;
   wherein a heating heat exchanger for heating a component assigned to the heating heat exchanger and/or for heating a medium flowing through the heating heat exchanger is disposed before the fuel cell heat exchanger in a flow direction;
   wherein an ion exchanger is disposed in parallel to the heating heat exchanger with respect to a through flow with the liquid coolant medium.

2. The cooling arrangement as claimed in claim 1, wherein the charge air cooler is disposed after the fuel cell heat exchanger in a flow direction of the liquid coolant medium.

3. The cooling arrangement as claimed in claim 1, further comprising a chamber heat exchanger for at least indirect heating of a chamber in one of the first or second cooling circuits.

4. The cooling arrangement as claimed in claim 3, wherein the chamber heat exchanger is disposed in the first cooling circuit.

5. The cooling arrangement as claimed in claim 3, wherein the first cooling circuit has a first partial circuit and a second partial circuit, wherein the chamber heat exchanger, the heating unit, and the second coolant pump are disposed in the first partial circuit, and wherein the fuel cell heat exchanger and the first coolant pump are disposed in the second partial circuit.

6. The cooling arrangement as claimed in claim 3, wherein the chamber heat exchanger is disposed in a radiator bypass line around the cooling heat exchanger.

7. The cooling arrangement as claimed in claim 1, wherein the heating heat exchanger is disposed in a pump bypass around one of the first and second coolant pumps.

8. The cooling arrangement as claimed in claim 1, wherein the second coolant pump is disposed in the second cooling circuit.

9. A cooling arrangement for cooling a fuel cell in a fuel cell system, comprising:
   a first cooling circuit and a second cooling circuit, wherein the first and second cooling circuits are fluidically connected and wherein a liquid coolant medium flows in the first and second cooling circuits;
   wherein the first cooling circuit includes a first coolant pump, a fuel cell heat exchanger, a heating unit, and a charge air cooler which is in heat-exchanging contact with compressed supply air flowing to the fuel cell;
   wherein the second cooling circuit includes a cooling heat exchanger for cooling the liquid coolant medium;
   a second coolant pump;
   wherein a heating heat exchanger for heating a component assigned to the heating heat exchanger and/or for heating a medium flowing through the heating heat exchanger is disposed before the fuel cell heat exchanger in a flow direction;
   wherein the heating heat exchanger heats expanded fuel for the fuel cell and/or heats a liquid separator.

10. The cooling arrangement as claimed in claim 9, wherein the charge air cooler is disposed after the fuel cell heat exchanger in a flow direction of the liquid coolant medium.

11. The cooling arrangement as claimed in claim 9, further comprising a chamber heat exchanger for at least indirect heating of a chamber in one of the first or second cooling circuits.

12. The cooling arrangement as claimed in claim 11, wherein the chamber heat exchanger is disposed in the first cooling circuit.

13. The cooling arrangement as claimed in claim 11, wherein the first cooling circuit has a first partial circuit and a second partial circuit, wherein the chamber heat exchanger, the heating unit, and the second coolant pump are disposed in the first partial circuit, and wherein the fuel cell heat exchanger and the first coolant pump are disposed in the second partial circuit.

14. The cooling arrangement as claimed in claim 11, wherein the chamber heat exchanger is disposed in a radiator bypass line around the cooling heat exchanger.

15. The cooling arrangement as claimed in claim 9, wherein the heating heat exchanger is disposed in a pump bypass around one of the first and second coolant pumps.

16. The cooling arrangement as claimed in claim 9, wherein the second coolant pump is disposed in the second cooling circuit.

* * * * *